(12) United States Patent
Murhpy et al.

(10) Patent No.: US 10,348,082 B2
(45) Date of Patent: Jul. 9, 2019

(54) THERMAL PROTECTION DEVICE

(71) Applicant: CREE, INC., Durham, NC (US)

(72) Inventors: Matthew K. Murhpy, Mukwonago, WI (US); Kurt S. Wilcox, Libertyville, IL (US); Pierre Deschenes, Muskego, WI (US); Craig D. Raleigh, Burlington, WI (US)

(73) Assignee: CREE, INC., Durham, NC (US)

( * ) Notice: Subject to any disclaimer, the term of this patent is extended or adjusted under 35 U.S.C. 154(b) by 523 days.

(21) Appl. No.: 14/793,445

(22) Filed: Jul. 7, 2015

(65) Prior Publication Data

US 2015/0340857 A1    Nov. 26, 2015

Related U.S. Application Data

(63) Continuation of application No. 13/728,761, filed on Dec. 27, 2012, now Pat. No. 9,105,429.

(51) Int. Cl.
  *H02H 5/04* (2006.01)
  *H01H 37/52* (2006.01)
  *H01H 37/72* (2006.01)
  *H05B 33/08* (2006.01)

(52) U.S. Cl.
  CPC ............. *H02H 5/04* (2013.01); *H01H 37/52* (2013.01); *H01H 37/72* (2013.01); *H05B 33/089* (2013.01)

(58) Field of Classification Search
  CPC .......... H02H 5/04; H01H 37/52; H01H 37/72; H05B 33/089

USPC ........................................................ 361/104
See application file for complete search history.

(56) References Cited

U.S. PATENT DOCUMENTS

| | | | |
|---|---|---|---|
| 5,023,744 A * | 6/1991 | Hofsass | H01H 1/504 337/365 |
| 5,689,173 A | 11/1997 | Oosaki et al. | |
| 5,978,196 A | 11/1999 | O'Boyle | |
| 6,072,680 A | 6/2000 | Goodwin et al. | |
| 6,349,023 B1 | 2/2002 | Greenberg | |
| 6,667,869 B2 | 12/2003 | Greenberg | |
| 6,838,834 B2 | 1/2005 | Okawa | |
| 7,428,133 B2 | 9/2008 | Lee | |
| 7,791,448 B2 | 9/2010 | Yu | |
| 7,808,361 B1 | 10/2010 | Yu | |
| 7,990,673 B2 | 8/2011 | Vinther | |
| 2008/0116851 A1 | 5/2008 | Mori | |
| 2010/0308739 A1 * | 12/2010 | Shteynberg | H05B 33/083 315/193 |
| 2011/0187283 A1 | 8/2011 | Wang et al. | |

* cited by examiner

*Primary Examiner* — Kevin J Comber
(74) *Attorney, Agent, or Firm* — Coats & Bennett, PLLC

(57) ABSTRACT

According to one aspect, a thermal protection device is provided having an electrical input for receiving input DC power and an electrical output for connection to a load. A heating circuit is coupled to the electrical input for developing one of first and second different heat magnitudes depending upon a temperature magnitude in the housing. An additional circuit is in thermal communication with the heating circuit for providing output DC power to the electrical output when the first heat magnitude is developed and for interrupting the output DC power when the second heat magnitude is developed.

20 Claims, 5 Drawing Sheets

THERMAL PROTECTION DEVICE

CROSS REFERENCE TO RELATED APPLICATIONS

This application is a continuation of U.S. patent application Ser. No. 13/728,761, filed Dec. 27, 2012, entitled "Thermal Protection Device".

REFERENCE REGARDING FEDERALLY SPONSORED RESEARCH OR DEVELOPMENT

Not applicable

SEQUENTIAL LISTING

Not applicable

BACKGROUND

1. Field of the Invention

The present invention relates generally to protection devices for loads, and more particularly to a thermal protection device for protecting a heat-producing load, such as an LED luminaire.

2. Description of the Background

Solid state light emitters including organic, inorganic, and polymer light emitting diodes (LEDs) may be utilized as an energy-efficient alternative to more traditional lighting systems. Many modern lighting applications utilize high power solid state emitters to provide a desired level of brightness. Generally, the lifetime of an LED is inversely related to the operating junction temperature thereof. Therefore, thermal management of the junction temperature is an important design consideration of a luminaire (i.e., a lighting fixture) incorporating one or more LED's. Many solid state luminaires utilize a heat exchanger that dissipates heat into the ambient environment so as to obtain a desired life of the solid state emitters. However, such luminaires can be installed in spaces containing insulation that can prevent the necessary airflow to maintain the junction temperature at or below an upper temperature limit. Because of this possibility, solid state luminaires typically are provided with a thermal protection circuit that disconnects the LEDs from a power source when a sensed temperature is reached. Often, such a circuit includes a bi-metal switch that opens when the sensed temperature exceeds a threshold and/or a one-time thermal fuse that breaks a circuit connection when a fusing temperature is reached.

LEDs operate more efficiently when powered by a direct current (DC) voltage rather than an alternating current (AC) voltage. Some known solid state luminaires utilize low power DC (i.e., at 60 volts or below). While low power DC solid state luminaires have some inherent advantages (including the ability to control the fixture with low power components and cabling), the use of low power DC can be problematic when designing a thermal protection circuit for the luminaire. Specifically, the lack of AC power at the fixture prevents the use of AC rated RP (thermal overload protection) devices and still meet UL1598 requirements. Also, the cost of the AC RP devices has been increasing of late due to the existence of few manufacturers. An off-the-shelf DC rated UL XAPX2/8 recognized thermal protection bi-metal switch is typically not specified for operation up to 60 VDC because such a device is too large and quite expensive. A UL XCMQ2/8 recognized TCO (thermal cutoff fuse) typically has a temperature difference between the fusing and the holding temperatures (i.e., the maximum normal operating temperature) that renders the device impossible to use with typical luminaire maximum operating temperatures.

SUMMARY

According to one aspect, a thermal protection device is provided having an electrical input for receiving input DC power and an electrical output for connection to a load. A heating circuit is coupled to the electrical input for developing one of first and second different heat magnitudes depending upon a temperature magnitude in the housing. An additional circuit is in thermal communication with the heating circuit for providing output DC power to the electrical output when the first heat magnitude is developed and for interrupting the output DC power when the second heat magnitude is developed.

According to a further aspect, a thermal protection device is provided having a housing, an electrical input for receiving input DC power, and an electrical output for connection to a load. A heating circuit is disposed in the housing and coupled to the electrical input and develops first and second different heat magnitudes depending upon a temperature in the housing. An additional circuit is operative to provide output DC power to the electrical output when the first heat magnitude is developed and to interrupt the output DC power when the second heat magnitude is developed.

According to yet another aspect, a thermal protection device is provided having a housing, an electrical input for receiving input DC power at a voltage magnitude up to 60 volts, and an electrical output for connection to a load. A heating circuit is disposed in the housing and coupled to the electrical input and includes first and second series-connected heating resistors and a thermal switch coupled in parallel across the second heating resistor, wherein the thermal switch causes the heating circuit to develop a first heat magnitude when the thermal switch is exposed to a temperature in the housing below a threshold temperature and causes the heating circuit to develop a second heat magnitude greater than the first heat magnitude when the thermal switch is exposed to the temperature in the housing above the threshold temperature. An additional circuit is disposed in the housing and coupled to the heating circuit and provides output DC power to the electrical output when the first heat magnitude is developed and interrupts the output DC power when the second heat magnitude is developed, wherein the additional circuit includes a thermal circuit breaker having a holding temperature greater than the threshold temperature and a fusing temperature greater than the holding temperature.

Although not so limited, the present invention finds particular utility in one or more aspects of providing thermal protection for a DC load, such as an LED luminaire, so that an over-temperature condition is avoided.

BRIEF DESCRIPTION OF THE DRAWINGS

Further aspects of the present invention will become evident by a reading of the attached specification and inspection of the attached drawings in which.

DETAILED DESCRIPTION

Figure 1:
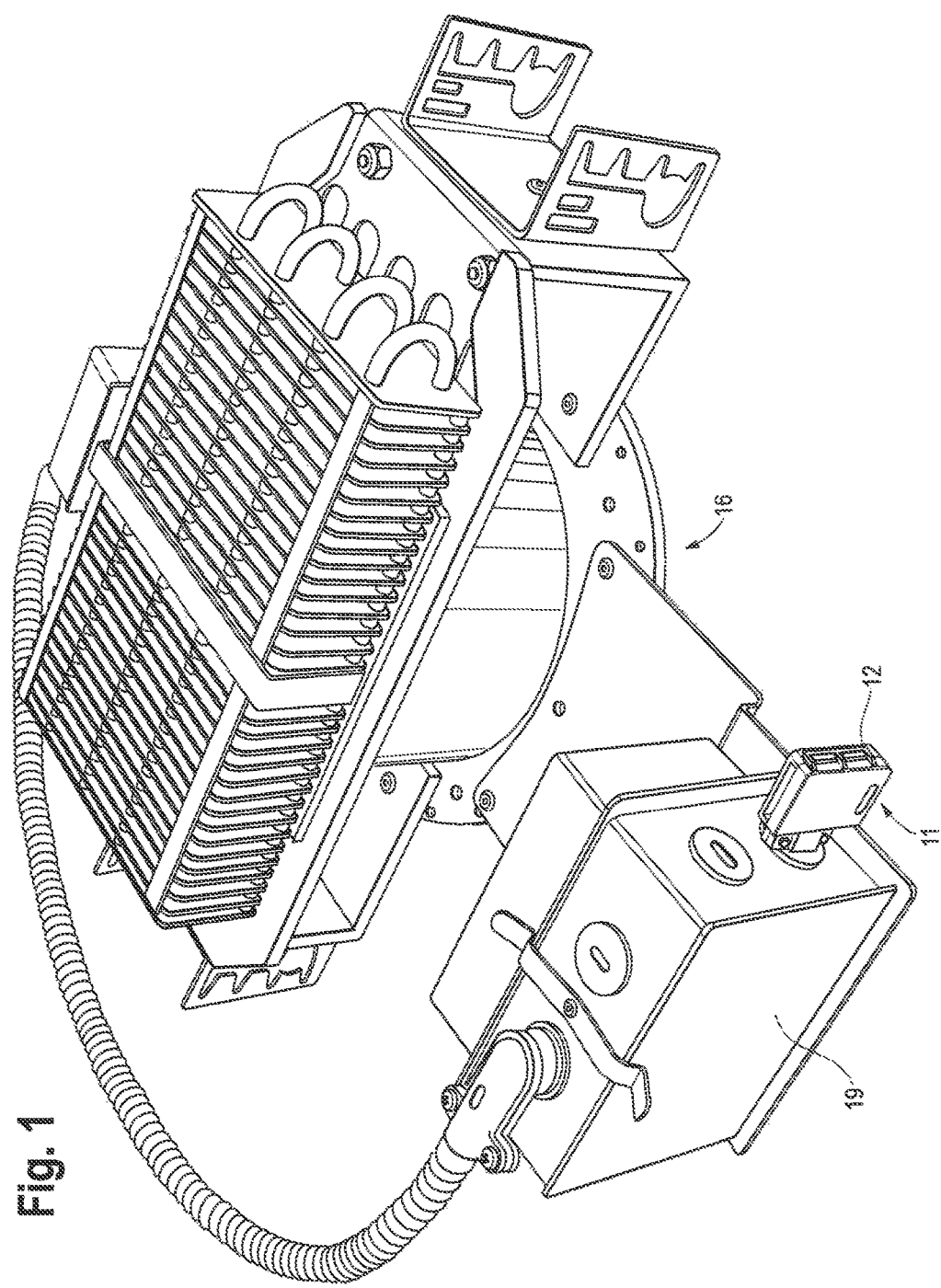
FIG. 1 is an isometric view of a luminaire incorporating a thermal protection device according to the present invention.
Figure 2:
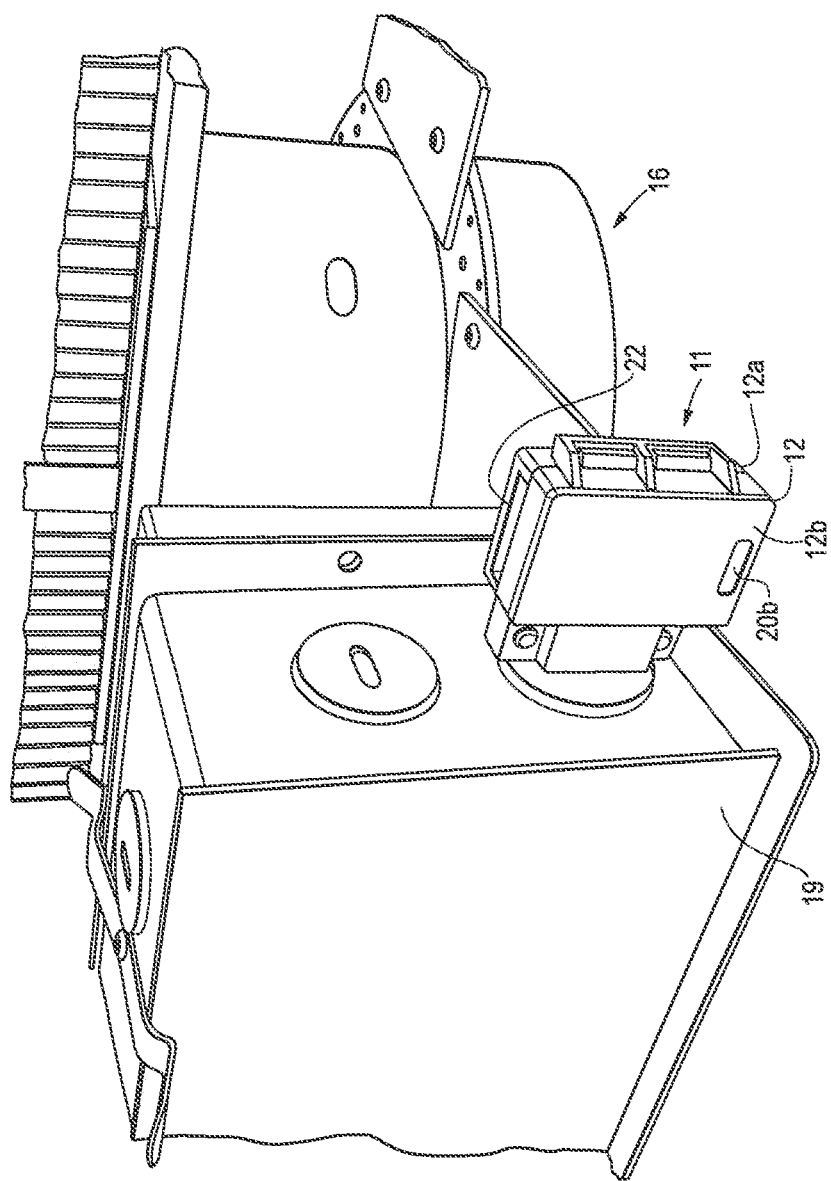
FIG. 2 is an enlarged, fragmentary, perspective view of a portion of the luminaire of FIG. 1 showing the thermal protection device in greater detail.
Figure 3:
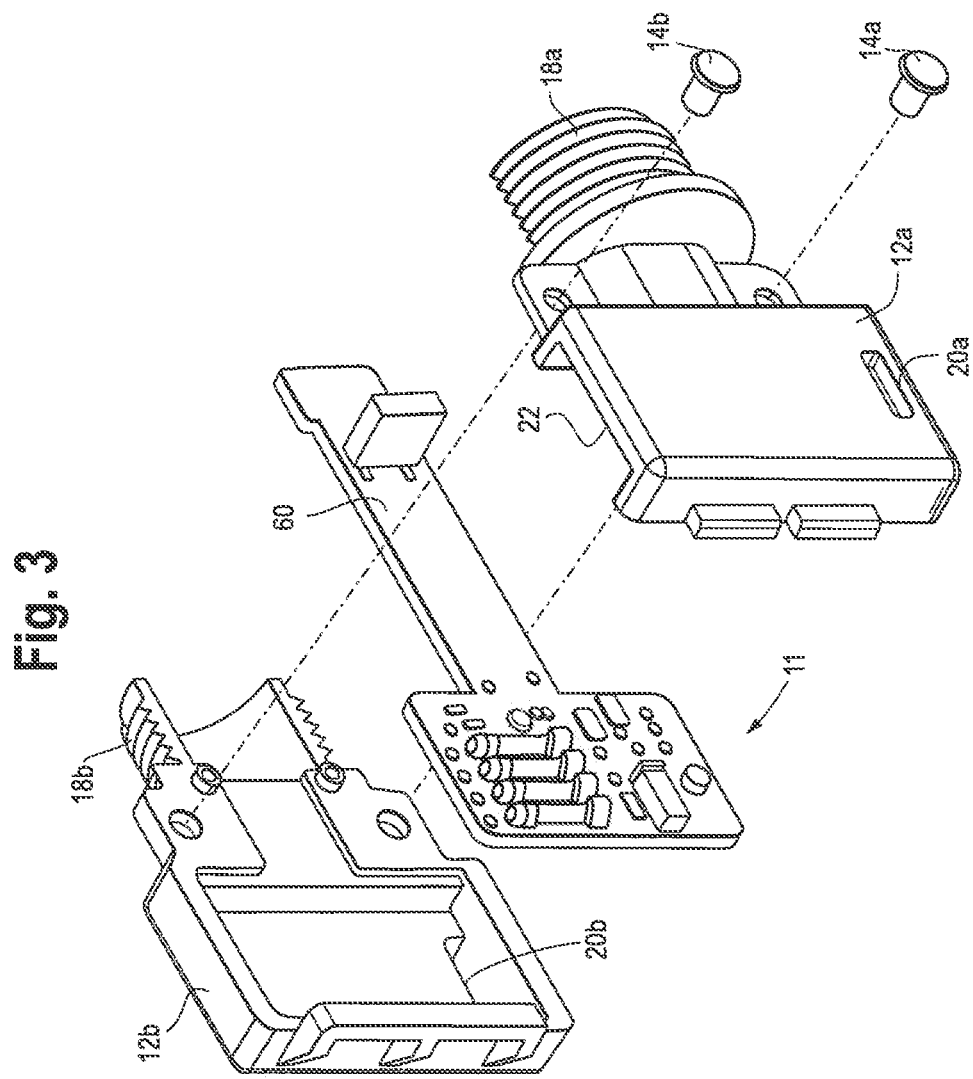
FIG. 3 is an exploded isometric view of an embodiment of the present invention.

Referring first to FIGS. 1-3, a thermal protection device 11 includes components disposed in a housing 12 comprising housing portions 12a and 12b. The housing portions 12a, 12b may be secured together in any suitable fashion, such as by fasteners comprising rivets or screws 14a, 14b. The housing 12 is adapted to be secured in any known fashion to a luminaire 16, such as an LED luminaire as seen in FIG. 2. In the illustrated embodiment, the housing 12 includes a threaded portion 18 (including threaded sections 18a, 18b) that may be inserted into a knock-out opening of a junction box 19. The threaded portion may receive a threaded nut (not shown) that secures the housing 12 to the junction box 19. The housing includes openings comprising vent holes 20a, 20b in the housing portions 12a, 12b, respectively, and a further opening comprising vent hole 22 in the portion 12a that permit air flow into the housing 12 such that the components therein are disposed in heat transfer relationship with the ambient environment surrounding the luminaire 12, particularly when the luminaire 16 is installed at or in a structure, such as a ceiling, wall, or other surface. As is event to one of ordinary skill, the space behind the ceiling, wall, or other surface occupied by the luminaire 16 may be filled with thermal insulation, which may interfere with the dissipation of heat developed by the luminaire 16. The LED(s) used in the luminaire 16 may heat to damaging or destructive levels and/or the useful lifetime of the LED(s) may be undesirably shortened if the luminaire 16 is not thermally protected.

Figure 6:
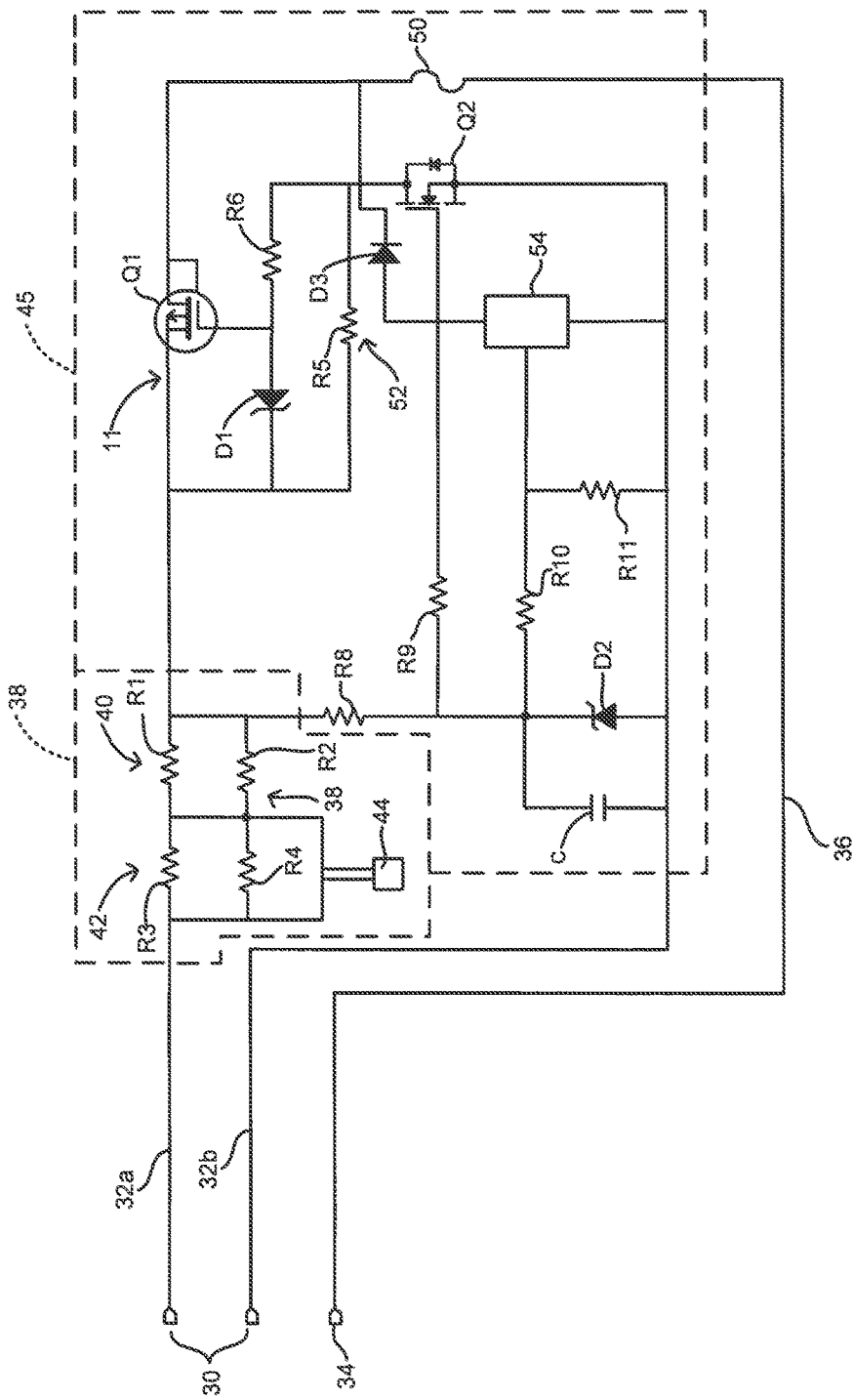
FIG. 6 is a schematic diagram of the circuit mounted on the circuit board of FIGS. 4 and 5.

Referring to FIG. 6, the thermal protection circuit 11 includes an input 30 coupled to conductors 32a, 32b and an output 34 coupled to a conductor 36. The input 30 receives DC power from a wall-mounted switch and power converter circuit (not shown) and components comprising LEDs of the luminaire 12 are coupled to the output 34. The thermal protection circuit includes a heating circuit 38 comprising at least a first heating element 40, a second heating element 42, and a thermal switch 44. In the preferred embodiment, each of the first and second heating elements 40, 42 is implemented by at least one heating resistor. In the illustrated embodiment, the first heating element 40 is implemented by a first pair of parallel-connected heating resistors R1, R2 and the second heating element 42 is implemented by a second pair of parallel-connected heating resistors R3, R4. In addition, the thermal switch 44 preferably comprises a bi-metal thermal switch. The heating circuit 38 develops a first heat magnitude when the housing 12, and/or the components therein is (are) exposed to a temperature below a threshold and further develops a second heat magnitude greater than the first heat magnitude when exposed to a temperature above the threshold. This functionality is achieved by selecting a thermal switch 44 having a switching point at the threshold temperature as noted in greater detail hereinafter such that the thermal switch is closed when exposed to a temperature below the threshold and is open when the temperature is above the threshold. As should be evident, the first heating element 40 develops heat when the thermal switch 44 is closed and the first and second elements 40, 42 both develop heat when the thermal switch 44 is open. In the preferred embodiment, the switching point of the thermal switch 44 is between about 65 degrees C. and about 70 degrees C., and is most preferably equal to about 70 degrees C.

A thermal circuit breaker 45 is coupled between the elements 40, 42 and the LEDs coupled to the output 34. Specifically, a controllable switch comprising a MOSFET transistor Q1 is coupled between the heating elements 40, 42 and a thermal fuse (in this case a thermal cut-out or TCO) 50. The TCO 50 is coupled to the output 34 and has a holding temperature and a trip or fusing temperature.

In the preferred embodiment, the holding temperature of the TCO 50 is about 100 degrees C. Also, the trip or fusing temperature is between about 119 degrees C. and about 125 degrees C., and is most preferably equal to about 125 degrees C.

From the foregoing, it can be ascertained that the holding temperature of the TCO 50 is preferably greater than the switching point of the thermal switch 44. Also, of course, the trip or fusing temperature is greater than the holding temperature.

The controllable switch Q1 is operated by a control circuit 52 in accordance with a negative temperature coefficient (NTC) signal so that the controllable switch Q1 can be controlled to interrupt current to the TCO 50 before the TCO trip or fusing temperature is reached. Specifically, referring to FIG. 6, under ordinary operating conditions (i.e., when an over-temperature condition is not being experienced), a resistor R8, a zener diode D2, and a capacitor C level shift and develop a regulated voltage of 15 volts across the capacitor C and the zener diode D2. A voltage divider comprising resistors R10 and R11 receive the 15 volt regulated signal and cause a voltage of less than 2.5 volts to be provided to a precision adjustable shunt regulator integrated circuit (IC) 54. The IC 54 is thereby maintained in an off condition at this time. In addition, a MOSFET transistor Q2 is on due to the biasing provided by resistors R8 and R9, thereby maintaining the controllable switch Q1 in the on state. The current through the transistor Q2 is limited by resistors R5 and R6, and the gate to source voltage of the controllable switch Q1 is limited by a zener diode D1. If the temperature in the housing 12 rises above the threshold temperature of the thermal switch 44, the thermal switch 44 opens, thereby causing current to flow through the resistors R3 and R4 and quickly increasing the temperature within the housing 12. When a housing temperature of, for example, about 90 degrees C., is reached, the regulated voltage delivered to the IC 54 rises above 2.5 volts, thereby turning IC 54 on and turning off transistor Q2 and the controllable switch Q1. The LEDs are thereby turned off and current flow through the resistors R1-R4 is interrupted until the temperature in the housing drops to a further level of, for example, about 80 degrees C. At this point the voltage delivered to the IC 54 drops below 2.5 volts, thereby turning off IC 54 and turning on transistor Q2 and the controllable switch Q1. The LEDs are turned back on and current flow is reestablished through the resistors R1-R4. The cycle then repeats indefinitely until power is removed from the luminaire. The LEDs thereby flash on and off without causing the TCO 50 to trip, thereby indicating to an observer that an over-temperature condition is being encountered.

Figure 5:
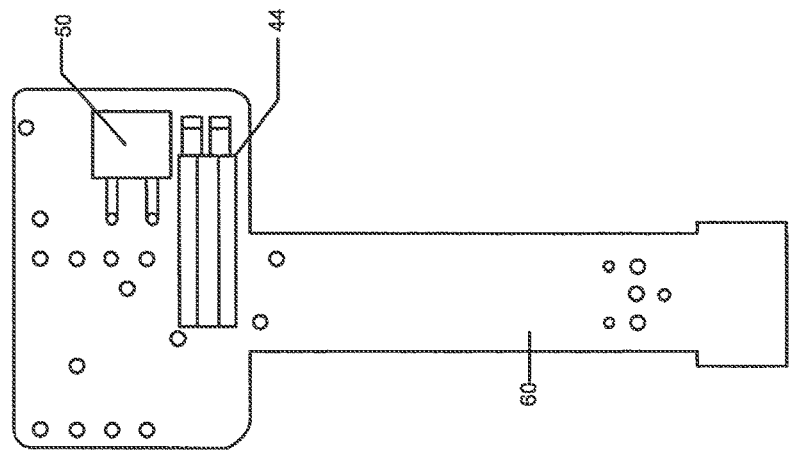
FIGS. 4 and 5 are front and back elevational views of a circuit board illustrating the mounting and positioning of circuit elements of the embodiment of FIGS. 1-3 thereon.
Figure 4:
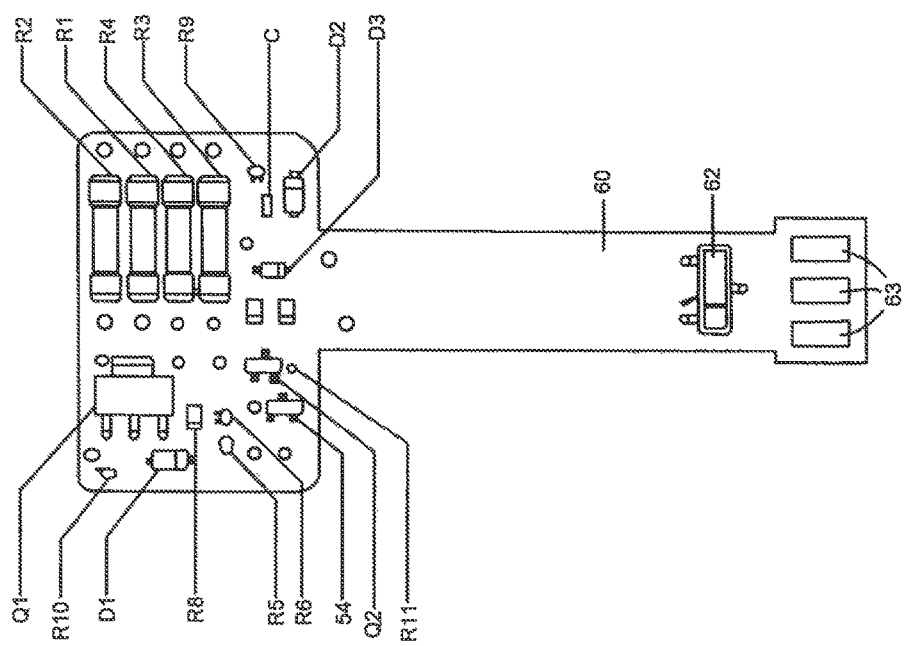

The components of the device 11 are carried by a circuit board 60 as seen in FIGS. 3-5. The circuit board 60 is secured inside the housing 12 in any suitable fashion.

Electrical connections to the inputs and output are accomplished via a header connector 62 and/or card edge connectors 63.

As is evident from the foregoing, the present invention utilizes a heat source inside the housing 12 when the load is operational comprising one or both of the two heating elements 40, 42. The current flowing through the first heating element produces heat that is transferred to the thermal switch 44 and the other components in the housing 12, including the TCO 50. The bi-metal thermal switch 44 is connected in parallel with one of the heating elements and is set to trip if the temperature inside the housing 12 reaches a certain point. When the thermal switch trip temperature is reached the thermal switch opens and current thereafter flows through the second heating element 42, which increases the heat level inside the housing 12. Significantly, when the thermal switch 44 opens, the switch 44 is only subjected to the current*resistance voltage drop (V=I*R). For example, assume that a current of 700 mA is flowing in the heating circuit 38 and that each heating element 40, 42 has an equivalent resistance of 3.4 ohms. The thermal switch 44 initially shorts out the resistors R3, R4 and when the switch 44 trips (i.e., opens) the current transitions to the 3.4 ohm heating element 42 from the thermal switch 44. The switch 44 has to break 700 mA at a voltage of 2.38 VDC, which is well within the specifications of off-the-shelf bi-metal switch devices. The second heating element 42 thereafter creates additional heat in the housing 12 and the temperature therein quickly rises. The use of the switch 44 opening and creating additional heat allows the TCO fusing temperature to be increased and keep the TCO holding temperature out of the normal operational range of the luminaire. (The range between the holding temperature and the fusing temperature (typically a 25 degree C. range) comprises a keep-out area in which the luminaire is prevented from operating). Eventually, the controllable switch Q1 is turned off before the TCO fusing temperature is reached in the housing 12 so that the current is interrupted before the one-time TCO trips. On the other hand, if the controllable switch Q1 fails to open before the fusing temperature is reached, the TCO trips, preventing power from reaching the LEDs of the luminaire. In either event, given the heat flow pattern in the housing 12, this heat rise can only occur if the airflow through the housing is blocked (e.g., when insulation is covering the vent holes 20, 22) or if ambient temperature increases past a certain point.

Because the TCO 50 is a one-time-only fuse it is protected by the controllable switch Q1 that is operated in accordance with a negative temperature coefficient developed signal. Of significance is the fact that none of the solid state devices used in the present invention is rated for thermal overload protection and therefore all are specified solely on performance criteria. Further, the fact that the controllable switch Q1 is in series with the resistors, TCO, and load facilitates satisfaction of UL requirements to short and open the semiconductor to evaluate fault conditions. Specifically, the switch Q1 can be maintained in the on condition such that the TCO is not protected and the internal housing temperature may be allowed to rise to the TCO fusing temperature. Conversely, the switch Q1 may be maintained in the off condition so that no current will flow and no heat is developed in the housing.

INDUSTRIAL APPLICABILITY

The present invention utilizes a combination of a change in convective cooling due to insulation placement and a rapid increase in the housing. These cascading events permit the use of off-the-shelf UL rated reliable components. The three main components are UL "reliable" power resistors as the heating elements 40, 42, the bi-metal thermal switch (which may be an XAPX2/8 device manufactured by Uchiya of Japan), and the TCO 50 (which may be an XCMQ2/8 device manufactured by Xiamen Set Electronics Co., Ltd. of Xiamen, China). The combination of these three components allows for a UL recognized device. The use of the switch Q1 in combination with the heating elements and TCO allows the device to comply with UL standards and further permits the circuit to shut off and cool down from high temperatures without causing the one-time TCO to trip (and thereby require servicing).

The present invention may be used in numerous applications, such as in EMI sensitive applications, such as MRI rooms, telephone central offices operating on 48 VDC, and safety lighting systems operating on DC backup. The present invention operates at 60V DC and at useful constant current inputs such as 525 mA and 1400 mA. New current levels can quickly be implemented with only a resistor value change. The circuit can pass UL tests as a stand-alone device. The circuit does not require the heating from the luminaire in order to operate. The circuit can mimic currently available AC thermal overload protector devices satisfying UL category XAPX2/8 specified ability to cycle on and off under thermal overload conditions and meets UL safety requirements for recessed devices using 25 VDC UL recognized bi-metal switches. The present invention further uses internal convective airflow to operate, and is not just a solid body. The TCO fusing temperature can be increased to ensure that an over-temperature condition does not cause operation in the temperature range between the holding temperature and the fusing temperature. Further, a fault resulting in the controllable switch remaining on during an over-temperature condition, as opposed to the intermittent operation of the switch Q1 as discussed above, will result in rapid heating to the fusing temperature and subsequent tripping of the TCO 50. Therefore, the time to trip in fault conditions is decreased.

As should be evident to one of ordinary skill in the art, the present invention can be implemented by other embodiments, structures, and/or processes. While the present invention is useful to provide thermal protection for a DC powered LED luminaire, the present invention can provide thermal protection for other loads that may or may not receive DC power.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A thermal protection device, comprising:
an electrical input for receiving input DC power;
an electrical output for connection to a load;
a heating circuit coupled to the electrical input for developing one of first and second different heat magnitudes depending upon a temperature magnitude in a housing;
an additional circuit in thermal communication with the heating circuit for providing output DC power to the electrical output when the first heat magnitude is developed and for interrupting the output DC power when the second heat magnitude is developed; and wherein the additional circuit comprises a controllable switch coupled between the heating circuit and a thermal fuse.

2. The thermal protection device of claim 1, further comprising a thermal circuit breaker in thermal communication with the heating circuit.

3. The thermal protection device of claim 2, wherein the heating circuit comprises a thermal switch that causes the heating circuit to develop the first heat magnitude when the thermal switch is exposed to a temperature below a threshold temperature and that causes the heating circuit to develop the second heat magnitude when the thermal switch is exposed to a temperature above the threshold temperature.

4. The thermal protection device of claim 3, wherein the thermal circuit breaker comprises a holding temperature greater than the threshold temperature and a fusing temperature greater than the holding temperature.

5. The thermal protection device of claim 3, wherein the heating circuit comprises a first heating element and a second heating element wherein the thermal switch is coupled in parallel with the second heating element.

6. The thermal protection device of claim 5, wherein the thermal switch comprises a bi-metal device comprising a switching point at the threshold temperature.

7. The thermal protection device of claim 5, wherein the controllable switch controls current through both the first and the second heating elements.

8. The thermal protection device of claim 7, wherein the controllable switch is operated in accordance with a negative temperature developed signal.

9. The thermal protection circuit of claim 1, wherein the electrical input is adapted to receive DC power up to 60 volts.

10. A thermal protection device, comprising:
a housing;
an electrical input for receiving input DC power;
an electrical output for connection to a load;
a heating circuit disposed in the housing and coupled to the electrical input and that develops first and second different heat magnitudes depending upon a temperature in the housing; and
an additional circuit operative to provide output DC power to the electrical output when the first heat magnitude is developed and to interrupt the output DC power when the second heat magnitude is developed;
wherein the additional circuit comprises a controllable switch coupled between the heating circuit and a thermal fuse.

11. The thermal protection device of claim 10, further comprising a thermal circuit breaker disposed in the housing.

12. The thermal protection device of claim 11, wherein the heating circuit comprises a thermal switch that causes the heating circuit to develop the first heat magnitude when the temperature in the housing is below a threshold temperature and that causes the heating circuit to develop the second heat magnitude when the temperature in the housing is above the threshold temperature.

13. The thermal protection device of claim 12, wherein the thermal circuit breaker comprises a holding temperature greater than the threshold temperature and a fusing temperature greater than the holding temperature.

14. The thermal protection device of claim 13, wherein the heating circuit comprises a first heating element and a second heating element wherein the thermal switch is coupled in parallel with the second heating element.

15. The thermal protection device of claim 14, wherein the thermal switch comprises a bi-metal device comprising a switching point at the threshold temperature.

16. The thermal protection device of claim 15, wherein the controllable switch controls current through both the first and the second heating elements.

17. The thermal protection device of claim 16, wherein the controllable switch is operated in accordance with a negative temperature developed signal.

18. The thermal protection circuit of claim 10, wherein the electrical input is adapted to receive DC power up to 60 volts.

19. A thermal protection device, comprising:
a housing;
an electrical input for receiving input DC power at a voltage magnitude up to 60 volts;
an electrical output for connection to a load;
a heating circuit disposed in the housing and coupled to the electrical input and comprising first and second series-connected heating resistors and a thermal switch coupled in parallel across the second heating resistor, wherein the thermal switch causes the heating circuit to develop a first heat magnitude when the thermal switch is exposed to a temperature in the housing below a threshold temperature and causes the heating circuit to develop a second heat magnitude greater than the first heat magnitude when the thermal switch is exposed to the temperature in the housing above the threshold temperature; and
an additional circuit disposed in the housing and coupled to the heating circuit and that provides output DC power to the electrical output when the first heat magnitude is developed and that interrupts the output DC power when the second heat magnitude is developed, wherein the additional circuit comprises a thermal circuit breaker comprising a holding temperature greater than the threshold temperature and a fusing temperature greater than the holding temperature;
wherein the additional circuit further comprises a controllable switch coupled between the heating circuit and a thermal fuse.

20. The thermal protection device of claim 19, wherein the controllable switch is operated in accordance with a negative temperature developed signal.

* * * * *